(12) United States Patent
Griffin et al.

(10) Patent No.: US 7,194,346 B2
(45) Date of Patent: Mar. 20, 2007

(54) UNIVERSAL OCCUPANT DETECTION AND DISCRIMINATION SYSTEM FOR A MULTI-PLACE VEHICLE

(75) Inventors: Dennis P. Griffin, Noblesville, IN (US); William W. Fultz, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 190 days.

(21) Appl. No.: 10/639,793

(22) Filed: Aug. 12, 2003

(65) Prior Publication Data

US 2005/0038586 A1  Feb. 17, 2005

(51) Int. Cl.
*G06F 17/00* (2006.01)

(52) U.S. Cl. ......................................... 701/45

(58) Field of Classification Search ................. 701/36, 701/45, 49; 280/727, 730.1, 735
See application file for complete search history.

(56) References Cited

U.S. PATENT DOCUMENTS

| | | | |
|---|---|---|---|
| 4,625,329 A | 11/1986 | Ishikawa et al. ............... 382/1 |
| 5,474,327 A | 12/1995 | Schousek | |
| 5,942,695 A | 8/1999 | Verma et al. | |
| 5,987,370 A | 11/1999 | Murphey et al. | |
| 6,012,007 A | 1/2000 | Fortune et al. | |
| 6,058,341 A | 5/2000 | Myers et al. | |
| 6,101,436 A | 8/2000 | Fortune et al. | |
| 6,138,067 A | 10/2000 | Cobb et al. | |
| 6,181,996 B1 * | 1/2001 | Chou et al. .................... 701/36 |
| 6,246,936 B1 | 6/2001 | Murphey et al. | |
| 6,360,618 B2 | 3/2002 | Anahid et al. | |
| 6,424,898 B2 | 7/2002 | Anishetty et al. | |
| 6,438,476 B1 | 8/2002 | Gray et al. | |
| 6,438,477 B1 | 8/2002 | Patterson et al. | |
| 6,479,766 B2 | 11/2002 | Gray et al. | |
| 6,542,802 B2 | 4/2003 | Gray et al. | |
| 6,578,871 B2 | 6/2003 | Gray et al. | |
| 6,587,770 B1 | 7/2003 | Gray et al. | |
| 2003/0184065 A1 * | 10/2003 | Breed et al. ................. 280/735 |
| 2004/0007681 A1 * | 1/2004 | Moisel et al. ........... 250/559.29 |

* cited by examiner

*Primary Examiner*—Thu V. Nguyen
(74) *Attorney, Agent, or Firm*—Jimmy L. Funke

(57) ABSTRACT

A universal, compartment-wide system identifies the presence and position of occupants of a multi-place vehicle by utilizing the occupants to conduct and radiate place-specific radio frequency signals that are received at various locations in the passenger compartment. The place-specific radio frequency signals are developed by low power transmitters disposed in the various seat/place locations, and a receiver disposed at a central location that is remote from the transmitters receives and decodes the signals radiated by the occupants to determine the number and location of the occupants. Additional receivers may be installed in specified regions to detect occupant intrusion into such regions, and in various control panels to assess driver distraction and to tailor the functional content and capability depending on whether a driver or non-driver is interacting with the control panel.

6 Claims, 2 Drawing Sheets

UNIVERSAL OCCUPANT DETECTION AND DISCRIMINATION SYSTEM FOR A MULTI-PLACE VEHICLE

TECHNICAL FIELD

The present invention is directed to occupant detection and discrimination in a multi-place vehicle, and more particularly to a universal or compartment-wide system that identifies the presence and position of the vehicle occupants.

BACKGROUND OF THE INVENTION

Various technologies have been suggested for detecting and locating the position of vehicle occupants, particularly in relation to the deployment of pyrotechnic supplemental restraint devices such as frontal and side air bags. It has also been suggested to adapt the operation of various electrical accessories to the detected occupant position. For example, the capacity and airflow of an air conditioning system and the balance controls of an audio system may be adjusted based on the number of occupants and their location, electrically positioned mirrors and displays (such as head-up displays) may be adjusted for driver height, and so on; see, for example, the U.S. Pat. No. 4,625,329 to Ishikawa et al., issued on Nov. 25, 1986. Additionally, the occupant presence information can be utilized to limit the information supplied to a driver so as to minimize driver distraction while providing more detailed information to a non-driver occupant; see, for example, the U.S. Pat. No. 6,181,996 to Chou et al., issued on Jan. 30, 2001.

In systems of the type described above, practical considerations such as cost and packaging significantly limit the system content and capability. As a result, only the most essential of functions (such as disabling airbag deployment for a child) are actually utilized in all but the most expensive production vehicles. Nevertheless, there is a continuing and growing demand for a system that will reliably and cost-effectively deliver information regarding occupant position, location and activity, since it is thought that occupant safety could be considerably improved if such information were available.

SUMMARY OF THE INVENTION

The present invention provides a universal or compartment-wide system that identifies the presence and position of the occupants of a multi-place vehicle by utilizing the occupants to conduct and radiate place-specific radio frequency signals that are received and processed at various locations in the passenger compartment. The place-specific radio frequency signals are developed by low power transmitters disposed in the various seat/place locations, and a receiver disposed at a central location that is remote from the transmitters receives and decodes the signals radiated by the occupants to determine the number and location of the occupants. Additional receivers may be installed in specified regions to detect occupant intrusion into such regions, and in specified control panels (such as HVAC or infotainment control panels) to assess driver distraction and to tailor the functional content and capability depending on whether a driver or non-driver is interacting with the control panel.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
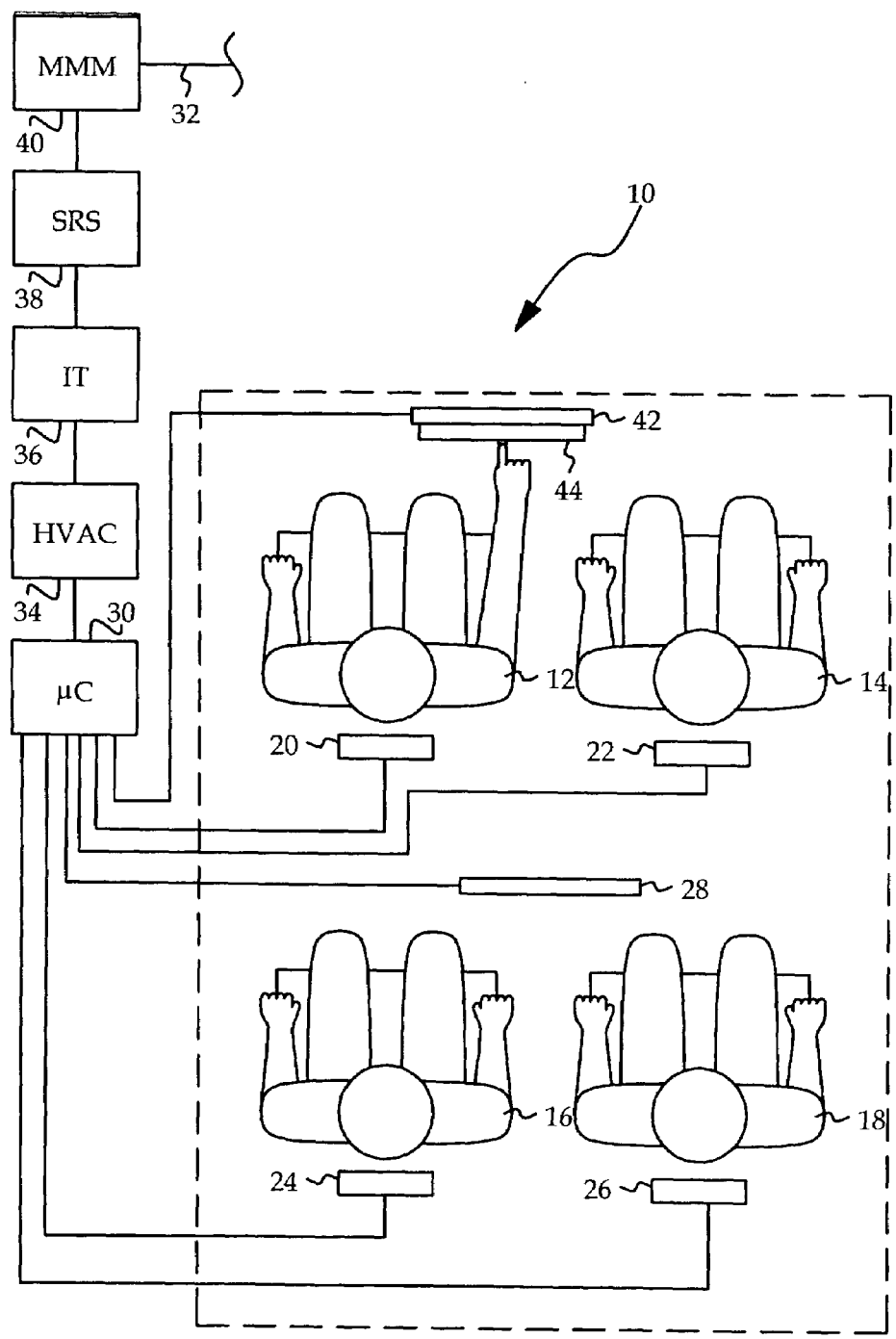
FIG. 1 is a diagram of a multi-place vehicle passenger compartment equipped with the occupant detection and discrimination system of this invention.

Referring to the drawings, and particularly to FIG. 1, the reference numeral 10 generally designates a multi-place passenger compartment of a motor vehicle, as viewed from overhead. In the illustrated embodiment, the passenger compartment 10 accommodates four occupants (driver 12, front passenger 14, left-rear passenger 16, and right-rear passenger 18), but it will be understood that the system of this invention is equally applicable to various other seating arrangements. Each place or seat location of the passenger compartment 10 is equipped with a low-power transmitter 20, 22, 24, 26 that develops and radiates a place-specific radio frequency signal. Each of the transmitters 20, 22, 24, 26 is powered via microcontroller 30, and is located in close proximity to the respective occupant 12, 14, 16, 18, such as in the seat bottom or back cushion. The various transmitted signals can be made place-specific by their frequency or by different modulation patterns imposed on a common frequency. The compartment 10 is further equipped with a radio frequency receiver 28 disposed at a location that is preferably central and equally remote from the transmitters 20, 22, 24, 26, such as in the compartment headliner or ceiling. The receiver, in turn, is coupled to the microcontroller 30 which identifies the number and location of the occupants. When a given place of the compartment 10 is vacant, the signal transmitted by the respective transmitter 20, 22, 24, 26 is only weakly received by the receiver 28, but when the place is occupied by a person, the signal is coupled through the person so that the signal received by receiver 28 is increased by several orders of magnitude. Given the place-specific nature of the signals, microcontroller 30 reliably detects the number and location of the occupants by simply determining which of the place-specific signals are received by receiver 28.

Once the number and location of the occupants is known, the microcontroller 30 provides such information to various other vehicle microcontrollers via the data bus 32. In the illustration of FIG. 1, for example, the HVAC control module 34, the infotainment (IT) module 36, the supplemental restraint system (SRS) control module 38, and the mobile multi-media (MMM) module 40 are also coupled to the data bus 32. The modules 34, 36, 38, 40 can utilize the occupant information to optimize various control parameters and to tailor their response based on the number and location of the occupants. For example, the HVAC module 34 can adjust the air conditioning capacity and airflow to optimize passenger comfort, the infotainment module 36 can adjust the sound distribution in the compartment 10, and the supplemental restraint control module 38 can enable, disable or control the deployment force of various supplemental restraint devices. Obviously, a number of other controls are also possible. Additionally, the occupant information may go beyond occupant presence, and include approximate proximity to the receiver 28; in this case, the occupant head height may be inferred, allowing appropriate positioning of electrically controlled mirrors, head-up displays, etc. Of course, the information deduced from the received signals may be combined with other related information such as seat position, seat belt signals, occupant weight, and so on to confirm and increase the extent of occupant information available to the various modules 34, 36, 38, 40.

In the illustrated embodiment, an additional receiver 42 is integrated into a driver interface panel 44, such as a HVAC control head or a mobile multi-media control panel. The receiver 40 is designed such that the signals transmitted by the driver 12 and front passenger 14 are only weakly received unless the driver 12 or front passenger 14 places his or her hand near the interface panel 44 in an attempt to adjust the settings thereof. The output of receiver 42 is coupled to microcontroller 30, which identifies the received signal to determine which of the occupants 12, 14 is attempting to interact with the interface panel 44. If the received signal is that of the driver transmitter 20, and the vehicle is moving, microcontroller 30 can signal the relevant modules 34, 36, 38, 40 to enable only limited or specified functionality to avoid undue driver distraction, or to enable minimum distraction functionality such as voice recognition for hands-free operation of the various modules 34, 36 38, 40 or telecommunication devices. On the other hand, if the received signal is that of the front passenger transmitter 22, the microcontroller 30 can signal the modules 34, 36, 38, 40 to enable expanded capability, communication and customization control functions, for example. Of course, the number of receivers and their effective range may be customized for any particular application; for example, receivers may be installed in several different control panels, or their range may be restricted to a certain region or button of a given control panel if desired. Additionally, the control panel may be as simple as a center-mounted or console-mounted lamp control with individual lamps for two or more passengers; in such case, a receiver can be installed in the lamp module to detect the presence of an occupant's hand in proximity to the lamp module, to determine the seat location of the occupant, and to activate (or deactivate) the lamp for that seating location. Obviously, the number of potential applications are too numerous to discuss or mention herein.

Figure 2:
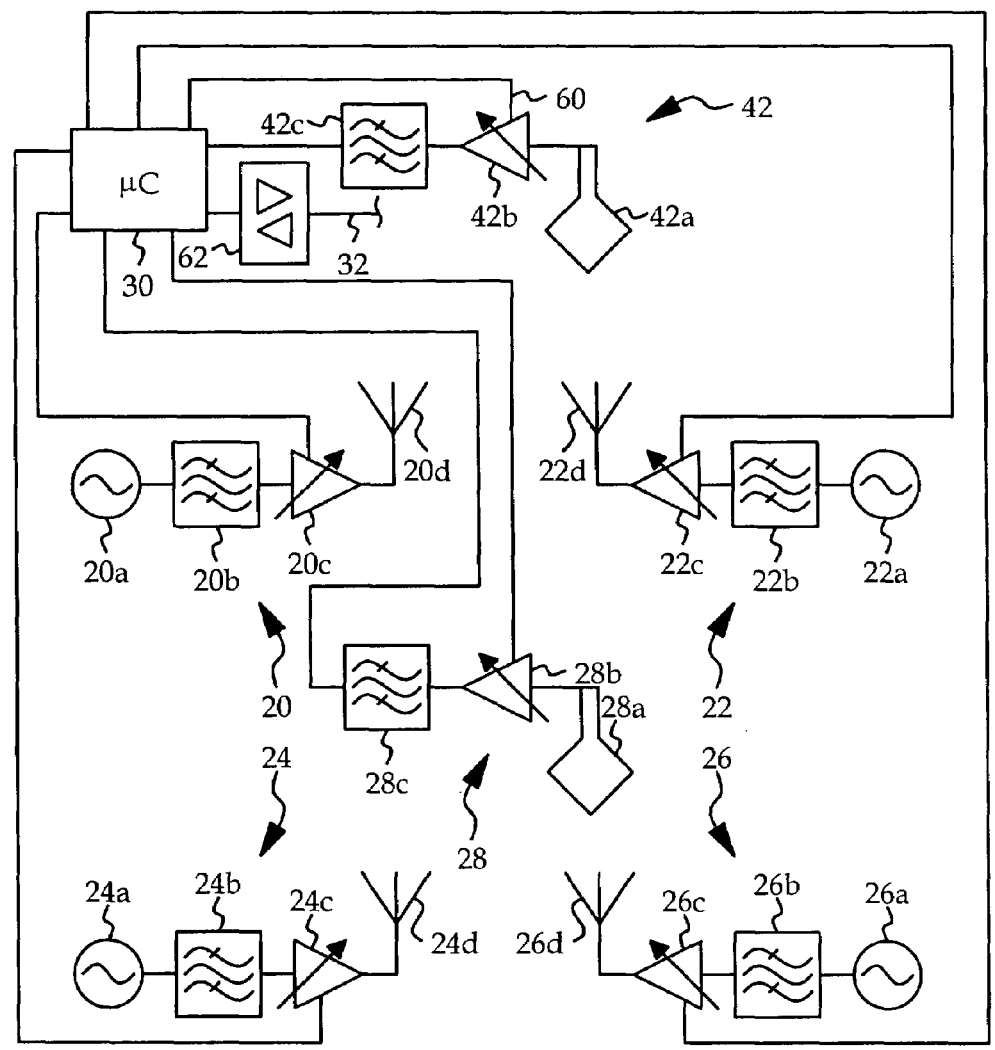
FIG. 2 is a block diagram of the occupant detection and discrimination system of FIG. 1.

FIG. 2 depicts basic component interconnections of the various receivers and transmitters of FIG. 1 for an embodiment in which each seat location of the compartment 10 is assigned a unique frequency. The transmitters 20, 22, 24, 26 each comprise an oscillator 20a, 22a, 24a, 26a; a bandpass filter 20b, 22b, 24b, 26b; a variable gain amplifier 20c, 22c, 24c, 26c; and an antenna 20d, 22d, 24d, 26d. The oscillators 20a, 22a, 24a, 26a and associated bandpass filters 20b, 22b, 24b, 26b produce sinusoidal waveforms having different predefined frequencies, preferably in the range of 60 kHz to 100 kHz. The waveforms are amplified by the respective variable gain amplifiers 20c, 22c, 24c, 26c and coupled to the antennas 20d, 22d, 24d, 26d, which may be conductive mats, threads, foil strips, etc. The gain of each amplifier 20c, 22c, 24c, 26c is regulated by microcontroller 30 based on the received signal strength in order to optimize the signal-to-noise ratio of the various signals. Similarly, the receivers 28, 42 each comprise an antenna 28a, 42a; a variable gain amplifier 28b, 42b; and a bandpass filter 28c, 42c. The antennas 28a, 42a may be similar to the antennas 20d, 22d, 24d, 26d and the variable gain amplifiers 28b, 42b are also controlled by microcontroller 30 for signal-to-noise ratio optimization and for optimal analog-to-digital conversion. However, the bandpass filters 28c, 42c are designed to pass all of the transmitted frequencies. The outputs of bandpass filters 28c, 42c are supplied to microcontroller 30, where they are converted to a digital format and processed to identify the transmitted frequencies and their amplitudes. As mentioned above, occupant presence in any given seat position is detected by the strength of the received signal emanating from that seat and its occupant, and microcontroller 30 places the occupant information on data bus 32 via transceiver 46.

In summary, the present invention provides a compartment-wide occupant detection system that identifies the presence and position of the occupants of a multi-place vehicle by utilizing the occupants themselves to conduct and emanate place-specific radio frequency signals that are received and processed at various locations in the passenger compartment. As discussed above, the system is easily extended to other components and control functions simply by increasing the number of receivers. The control functions mentioned herein are illustrative only, and are by no means exhaustive. Accordingly, it is expected that various modifications and alternations in addition to those mentioned herein may occur to those skilled in the art, and it should be understood that systems incorporating such modifications may fall within the scope of this invention, which is defined by the appended claims.

The invention claimed is:

1. Apparatus for detecting and identifying occupants of a vehicle cabin having first and second seats, comprising:
   a first receiver disposed at a central location of said cabin for receiving and identifying radio frequency signals;
   a first transmitter located in the first seat for radiating a first uniquely identifiable radio frequency signal that is weakly received by said first receiver when the first seat is unoccupied and strongly received and identified by said first receiver when a first human occupant is present on the first seat due to the first radio frequency signal being coupled to the first receiver through the first human occupant;
   a second transmitter located in the second seat for radiating a second uniquely identifiable radio frequency signal that is weakly received by said first receiver when the second seat is unoccupied and strongly received and identified by said first receiver when a second human occupant is present on the second seat by virtue of the second radio frequency signal being coupled to the first receiver through the second human occupant; and
   a processor coupled to the first receiver for determining a total number of said human occupants and their seat locations based on whether the first radio frequency signal and the second radio frequency signal are strongly received by said first receiver.

2. The apparatus of claim 1, wherein said processor additionally determines a distance of said human occupants from said first receiver.

3. The apparatus of claim 1, wherein said first receiver identifies said first and second radio frequency signals by their frequency.

4. The apparatus of claim 1, wherein said first receiver identifies said first and second radio frequency signals by their modulation pattern.

5. The apparatus of claim 1, wherein said first receiver is disposed in a headliner of said cabin.

6. The apparatus of claim 1, further comprising:
   an interface panel that can be accessed by different human occupants of said cabin;
   a second receiver disposed in proximity to said interface panel for receiving and identifying radio frequency signals, such that said second receiver strongly receives and identifies said first radio frequency signal when said first human occupant is accessing said interface panel, and strongly receives and identifies said second radio frequency signal when said second human occupant is accessing said interface panel; and a secondary processor coupled to said second receiver for determining whether a human occupant is accessing said interface panel and a seating location of that human occupant based on which of the first and second radio frequency signals are strongly received by said second receiver.

\* \* \* \* \*